T. G. PHINNY.
TANK CAR.
APPLICATION FILED AUG. 5, 1908.

911,607.

Patented Feb. 9, 1909.
2 SHEETS—SHEET 1.

Witnesses
Ernest F. Riley
John H. ——

Inventor
Thomas G. Phinny
by
James W. Bevans
his Attorney

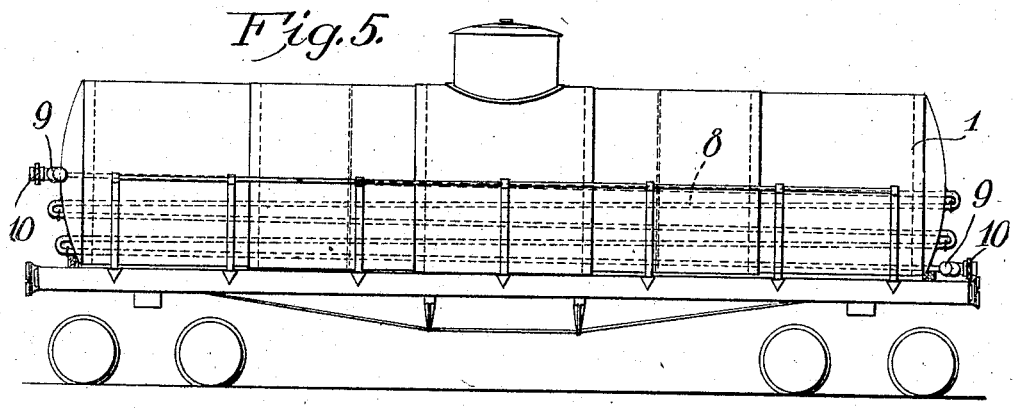
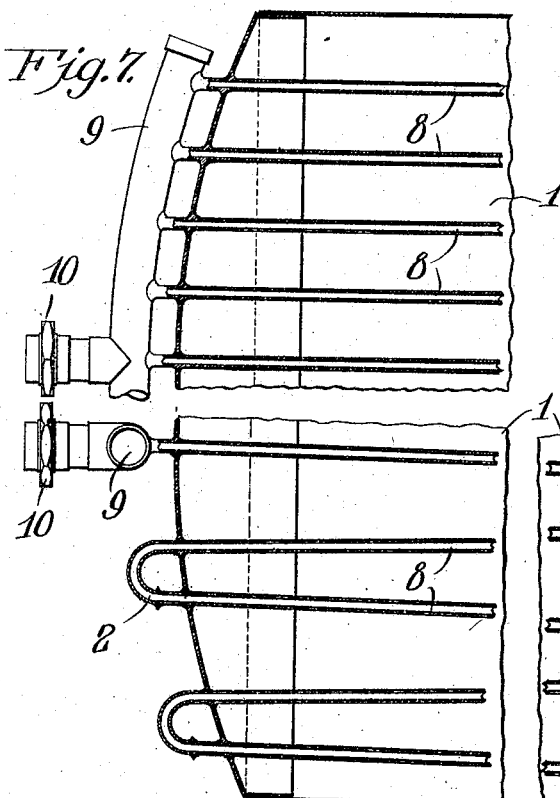
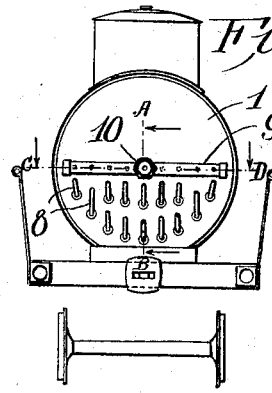
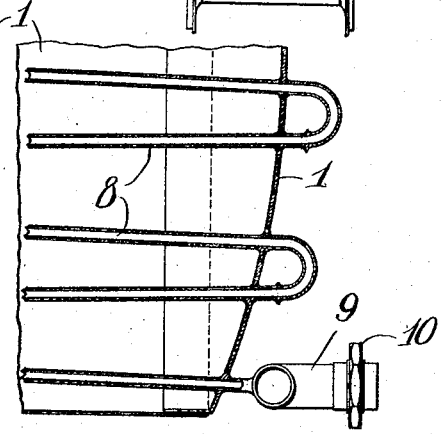

UNITED STATES PATENT OFFICE.

THOMAS GRAY PHINNY, OF PHILADELPHIA, PENNSYLVANIA.

TANK-CAR.

No. 911,607.   Specification of Letters Patent.   Patented Feb. 9, 1909.

Application filed August 5, 1908. Serial No. 447,161.

*To all whom it may concern:*

Be it known that I, THOMAS G. PHINNY, a citizen of the United States, residing at Philadelphia, in the county of Philadelphia and State of Pennsylvania, have invented certain new and useful Improvements in Tank-Cars, of which the following is a specification.

This invention relates to improvements in tank cars, and the object is to provide a tank car having internal piping or tubing provided with means on the exterior of the car for temporary attachment to a steam supply and exhaust, the piping being arranged to insure perfect drainage, and where it enters the tank being united to the walls thereof in such manner as to form an integral part of the latter, and the several sections of piping being similarly united, the car and piping being thus a homogeneous structure, whereby leakage is obviated, and the breaking of the pipe sections or the loosening or disconnection thereof from each other or from the walls of the car by the jarring or bumping of the latter, prevented.

With the above objects in view, the invention consists in the novel features of construction hereinafter fully described, particularly pointed out in the claims, and clearly illustrated by the accompanying drawings, in which—

Figure 1:
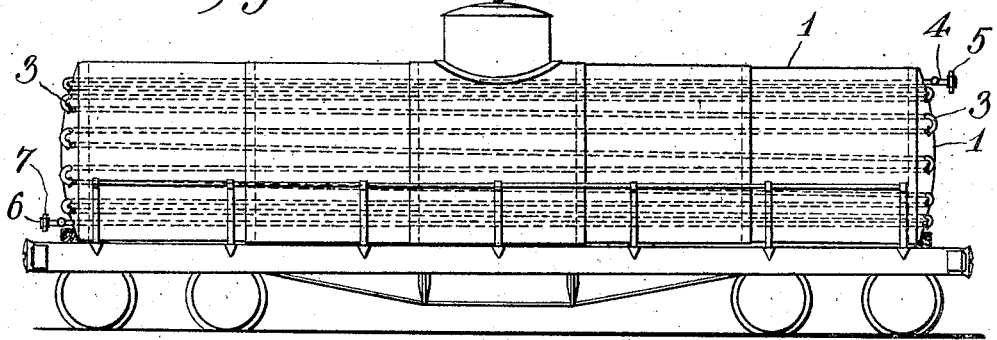
Figure 3:
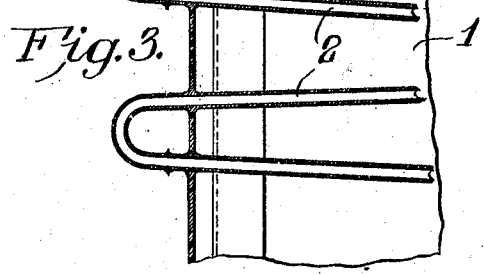
Figure 2:
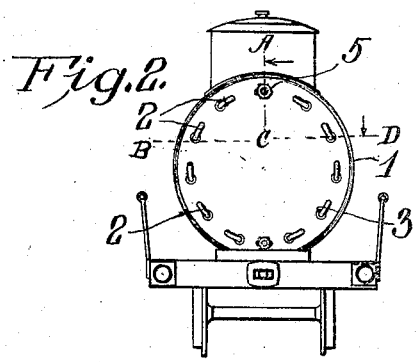
Figure 4:
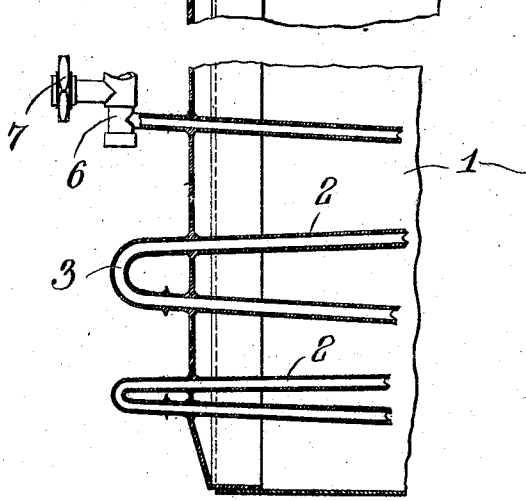
Figure 4:
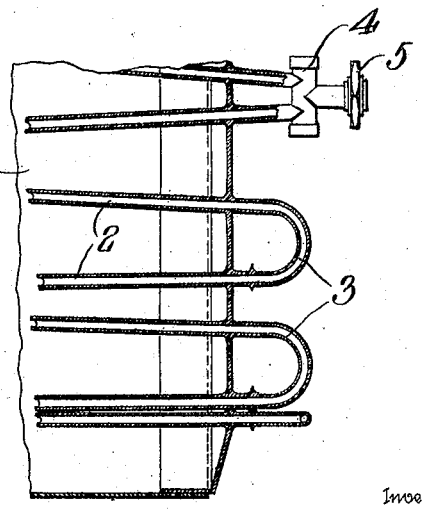

Figure 1 is a side elevation of a tank car constructed in accordance with my invention; Fig. 2, an end elevation of the same; Fig. 3, an enlarged sectional view through the head or end-wall of the car taken at A, C, B, Fig. 2; Fig. 4, a similar view taken at A, C, D, of the same figure; Fig. 5, a side elevation of a tank car showing a different arrangement of heating coils; Fig. 6, an end elevation of the car; Fig. 7, an enlarged horizontal sectional view on line C, D, of Fig. 5, and Fig. 8, an enlarged vertical sectional view on the line A, B, of said figure.

Referring now more particularly to the drawings, the numeral 1 designates the body or tank of the usual construction of tank car, having arranged therein a heating pipe formed into a plurality of coils 2. These coils extend longitudinally of the tank on the interior thereof and their arrangement may be that best adapted to perform the required work, namely, heating the oil in the tank to facilitate and expedite the discharge thereof from the car. In the arrangement shown in Figs. 1, 2, 3 and 4, the coils are disposed about the entire inner circumference of the tank. The several sections employed to form the coils are welded together, thus forming a continuous, substantially integral tubing or piping, the several coils or runs of which are so disposed as to insure perfect drainage from the entire piping of all condensed steam therein after the steam supply is cut off. The several runs of piping forming the coils are connected by the return bends 3 on the exterior of the heads of the tank as clearly shown and where the pipes pass through suitable openings made therefor in the tank-heads, they are secured by welding, thus not only preventing leakage from the tank at these points, but also making the piping a permanent part of the car. The entire piping and the tank are thus practically integral and constitute a homogeneous structure.

Piping has heretofore been used in a tank car for the purpose of heating the contents of the latter, but the joints have been made by screw-threads or some other similar means. This arrangement lasts but a short time and must be constantly repaired, as the joints are broken by the jarring and bumping of the car while in transit or while being shifted in the yards. By welding the piping in accordance with my invention, the pipe sections cannot separate, nor can they break loose from the walls of the tank and cause leakage no matter how severe the strain thereon. In fact, the life of the heating coils is equal to that of the tank itself, and nothing short of the smashing or destruction of the car will destroy the usefulness thereof.

The piping is provided at one end on the exterior of the tank-head with a steam-supply connection 4 having a suitable valve 5, and at the opposite end with a similarly-placed exhaust-connection 6 provided with a valve 7, the piping being united to the connections by welding.

When the oil is to be removed from the tank temporary connection is made with a source of steam-supply and the circulation of the steam through the coils on the interior of the tank, heats the contents of the latter and thus facilitates the removal of the latter.

In Figs. 4, 5, 6 and 7, a different arrangement of the coils is shown, a number of coils 8 being provided in the lower half of the tank extending longitudinally thereof. These coils are welded to the heads of the tank and the runs forming the same similarly united, as in the construction hereinbefore described.

The exhaust and supply ends of the several coils are connected on the exterior of the tank-heads, by welding, to manifolds 9, provided with valves 10, so as to admit of one supply and one exhaust connection for each of the coils.

Having thus fully described my invention what I claim as new and desire to secure by Letters Patent of the United States, is:

1. In an oil receptacle, a heating pipe arranged upon the interior thereof and having means on the exterior of the receptacle for temporary connection with a steam supply and exhaust, the pipe being attached to the receptacle in such manner as to be substantially integral therewith.

2. In a receptacle for oil and the like, a heating pipe arranged upon the interior thereof and extending through the walls thereof to the exterior and having means on its projecting ends for temporary attachment to a steam supply and exhaust, the pipe where it passes through the walls of the receptacle being united thereto by welding.

3. In a receptacle for oil and the like, a heating coil arranged upon the interior thereof with the return bends arranged upon the exterior of the receptacle, said heating coil being provided upon the exterior of the receptacle with means for temporary attachment to a steam supply and exhaust, the sections of piping forming the coil being united to each other and the coil where it passes through the walls of the receptacle being united thereto by welding.

4. A tank car having one or more heating coils arranged therein with the runs thereof extending through the walls of the tank and the return bends on the exterior thereof, said coils provided on the exterior of the tank with means for temporary connection with a steam supply and exhaust, and the sections of piping forming the coils being so connected and the coils being so united to the walls of the tank as to form one homogeneous structure.

5. A tank car having internal piping comprising continuous welding coils having the runs thereof extending through the ends of the tank with the return bends upon the exterior of the tank, the runs where they pass through the tank-ends being welded thereto, said coils having means on the exterior of the tank for temporary connection with a steam supply and exhaust, and the piping being so arranged as to insure drainage from all parts thereof.

6. A tank car having internal piping comprising one or more coils extending longitudinally of the tank with the runs thereof extending through the end-walls of the latter with the return bends upon the exterior of the tank, the sections of piping forming the coils being welded together, and the coils where they pass through the walls of the tank being welded to the latter, said coils provided upon the exterior of the tank with means for temporary connection with a steam supply and exhaust.

In testimony whereof I affix my signature, in presence of two witnesses.

THOMAS GRAY PHINNY.

Witnesses:
GEO. M. HARDEN,
WALTER C. BALDWIN.